US011983208B2

(12) United States Patent
Osuala et al.

(10) Patent No.: US 11,983,208 B2
(45) Date of Patent: May 14, 2024

(54) SELECTION-BASED SEARCHING USING CONCATENATED WORD AND CONTEXT

(71) Applicant: INTERNATIONAL BUSINESS MACHINES CORPORATION, Armonk, NY (US)

(72) Inventors: Richard Obinna Osuala, Munich (DE); Christoph Adrian Miksovic Czasch, Aeugst am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/176,200

(22) Filed: Feb. 16, 2021

(65) Prior Publication Data
US 2022/0261428 A1    Aug. 18, 2022

(51) Int. Cl.
  *G06F 16/33*   (2019.01)
  *G06F 16/338*  (2019.01)
  *G06N 3/04*    (2023.01)

(52) U.S. Cl.
  CPC ........ *G06F 16/3347* (2019.01); *G06F 16/338* (2019.01); *G06N 3/04* (2013.01)

(58) Field of Classification Search
  CPC ...... G06F 16/3347; G06F 16/338; G06N 3/04
  See application file for complete search history.

(56) References Cited

U.S. PATENT DOCUMENTS

| 8,452,769 | B2 | 5/2013 | Altaf |
| 8,645,289 | B2 | 2/2014 | Bennett |
| 8,719,192 | B2 | 5/2014 | Ji |
| 10,459,962 | B1 | 10/2019 | Jayaraman |
| 10,521,656 | B2 | 12/2019 | Van Rotterdam |

(Continued)

FOREIGN PATENT DOCUMENTS

| CN | 110442777 A | 11/2019 |
| CN | 111160007 A | 5/2020 |
| WO | 2012151005 A1 | 11/2012 |

OTHER PUBLICATIONS

Emtage, "Archie," Chapter 7, Intelligent Information Retrieval: The Case of Astronomy and Related Space Sciences, 1993 Kluwer Academic Publishers, pp. 103-111.

(Continued)

*Primary Examiner* — Mark D Featherstone
*Assistant Examiner* — Ranjit P Doraiswamy
(74) *Attorney, Agent, or Firm* — Caleb D. Wilkes

(57) ABSTRACT

A method, computer system, and a computer program product for searching are provided. The method may include receiving a word and a context of the word. The context may include additional words. A first word embedding may be generated by inputting a sequence into a word embedding model that resultantly outputs the first word embedding. The sequence may include the word and the context that are concatenated to each other in the sequence. The first word embedding may be compared with other word embeddings. The other word embeddings may have been generated by inputting respective text portions of other texts into the word embedding model. A candidate match of the other texts may be presented. A respective word embedding of the candidate match may be, of the other word embeddings, most similar to the first word embedding according to the comparing.

20 Claims, 9 Drawing Sheets

(56) References Cited

U.S. PATENT DOCUMENTS

| | | | |
|---|---|---|---|
| 10,671,812 | B2 | 6/2020 | Bondugula |
| 11,210,306 | B2* | 12/2021 | Steedman Henderson ................. G06N 3/08 |
| 2005/0187920 | A1 | 8/2005 | Tenembaum |
| 2011/0208730 | A1 | 8/2011 | Jiang |
| 2014/0032522 | A1 | 1/2014 | Bhola |
| 2015/0100562 | A1* | 4/2015 | Kohlmeier ............. G06N 20/20 707/706 |
| 2015/0293976 | A1 | 10/2015 | Guo |
| 2018/0349477 | A1* | 12/2018 | Jaech ................. G06F 16/3334 |
| 2019/0370273 | A1* | 12/2019 | Frison ................. G06F 16/3347 |
| 2020/0117710 | A1* | 4/2020 | Okura ................... G06F 40/232 |
| 2020/0226126 | A1 | 7/2020 | Zou |
| 2020/0302530 | A1 | 9/2020 | Lane |
| 2022/0051080 | A1* | 2/2022 | Hajarnis ................. G06F 16/35 |

OTHER PUBLICATIONS

Brin et al., "The anatomy of a large-scale hypertextual Web search engine", Computer Networks and ISDN Systems, vol. 30, 1998, pp. 107-117.

Cer et al., "Universal Sentence Encoder," arXiv:1803.11175v2 [cs.CL] Apr. 12, 2018, Retrieved from the Internet: <https://arxiv.org/pdf/1803.11175v2.pdf>, 7 pages.

Colditz et al., "The Use of Estrogens and Progestins and the Risk of Breast Cancer in Postmenopausal Women," The New England Journal of Medicine, Jun. 15, 1995, vol. 332, No. 24, pp. 1589-1593.

Devlin et al., "BERT: Pre-training of Deep Bidirectional Transformers for Language Understanding," arXiv:1810.04805v2 [cs.CL] May 24, 2019, Retrieved from the Internet: <https://arxiv.org/pdf/1810.04805.pdf?>, 16 pages.

Garba et al., Proliferations of Scientific Medical Journals: A Burden or a Blessing, Oman Medical Journal 2010, vol. 25, Issue 4, Oct. 2010, 4 pages.

Github, "txxtai: AI-powered search engine," release V1.5.0, release date Nov. 2020, [accessed Jan. 5, 2021], Retrieved from the Internet: <https://github.com/neuml/txtai>, 9 pages.

Huang et al., "Learning Deep Structured Semantic Models for Web Search using Clickthrough Data," CIKM '13: Proceedings of the 22nd ACM international conference on Information & Knowledge Management, Oct. 2013, pp. 2333-2338, https://doi.org/10.1145/2505515.2505665.

Jina AI (company), "Welcome to Jina!", Version: 0.8.16, [accessed Dec. 28, 2020], Retrieved from the Internet: <https://docs.jina.ai/>, 2 pages.

Landthaler et al., "User Study on Selection Search and Semantic Text Matching in German Tenancy Law," IRIS: Internationales Rechtsinformatik Symposium, Salzburg, Austria, 2019, 10 pages.

Le et al., "Distributed Representations of Sentences and Documents," Proceedings of the 31st International Conference on Machine Learning, Beijing, China, 2014. JMLR:W&CP vol. 32, 9 pages.

Li et al., "Enhancing BERT Representation With Context-Aware Embedding for Aspect-Based Sentiment Analysis," IEEE Access, Mar. 5, 2020, vol. 8, pp. 46868-46876.

Mell et al., "The NIST Definition of Cloud Computing", National Institute of Standards and Technology, Special Publication 800-145, Sep. 2011, 7 pages.

Mezzetti, "Introducing txtai, an AI-powered search engine built on Transformers Add Natural Language Understanding to any application," towards data science, Aug. 19, 2020, [accessed Jan. 5, 2021] Retrieved from the Internet: <https://towardsdatascience.com/introducing-txtai-an-ai-powered-search-engine-built-on-transformers-37674be252ec>, 10 pages.

Mikolov et al., "Efficient Estimation of Word Representations in Vector Space," arXiv:1301.3781v3 [cs.CL] Sep. 7, 2013, Retrieved from the Internet: <https://arxiv.org/pdf/1301.3781.pdf>, 12 pages.

Nakamura et al., "An anatomy for neural search engines," Information Sciences, vol. 480, (2019), Available online Dec. 22, 2018, https://doi.org/10.1016/j.ins.2018.12.041, pp. 339-353.

Nayak, "Understanding searches better than ever before," blog.google, Oct. 25, 2019, [accessed Jan. 5, 2021], Retrieved from the Internet: <https://blog.google/products/search/search-language-understanding-bert/>, 11 pages.

Patel M., "TinySearch—Semantics based Search Engine using Bert Embeddings," arXiv:1908.02451v1 [cs.IR] Aug. 7, 2019, Retrieved from the Internet: <https://arxiv.org/ftp/arxiv/papers/1908/1908.02451.pdf>, 8 pages.

Pogiatzis, "NLP: Contextualized word embeddings from BERT Extract contextualized word embeddings from BERT using Keras and TF," Towards Data Science, Mar. 20, 2019, [accessed Dec. 28, 2020], Retrieved from the Internet: <https://towardsdatascience.com/nlp-extract-contextualized-word-embeddings-from-bert-keras-tf-67ef29f60a7b>, 20 pages.

Rajasekharan, "Semantic search using BERT embeddings," Medium, Mar. 23, 2019, [accessed Dec. 28, 2020], Retrieved from the Internet: <https://ajitrajasekharan.medium.com/semantic-search-using-bert-embeddings-511c5d78348e>, 19 pages.

Reimers et al., "Sentence-BERT: Sentence Embeddings using Siamese BERT-Networks," arXiv:1908.10084v1 [cs.CL] Aug. 27, 2019, Retrieved from the Internet: <https://arxiv.org/pdf/1908.10084.pdf>, 11 pages.

Vaswani et al., "Attention Is All You Need," 31st Conference on Neural Information Processing Systems (NIPS 2017), arXiv:1706.03762v5 [cs.CL] Dec. 6, 2017, 15 pages.

Wikipedia, "Selection-based search," [accessed Jan. 5, 2021], Retrieved from the Internet: <https://en.wikipedia.org/wiki/Selection-based_search>, page last edited on Mar. 14, 2019, 3 pages.

* cited by examiner

Successfully loaded transformer model and vocab

Search Text Context Window: A hormone in oncology that allows specific cancer cells to grow.

Search Text Selected Words: ['hormone']

Document Text in Database: Colditz et al (1995) state that the effect of adding progestins to estrogen therapy on the risk of breast cancer in postmenopausal women is controversial.

Comparing Query ('hormone', Vector 1) with Document Word ('estrogen', Vector 2) ← 602

```
>>> tensor([ 0.6908,  0.5120, -0.2972,  ...,  0.6432, -0.9777,  0.2297],
    dtype=torch.float64)
```
← 604

```
>>> tensor([ 4.8761,  1.5059, -0.6988,  ...,  3.3917,  1.8148,  0.1401],
    dtype=torch.float64)
```

```
>>> distance.cosine([tensor([ 0.6908,  0.5120, -0.2972,  ...,  0.6432, -0.9777,  0.2297])], [tensor([ 4.8761, 1.5059,
-0.6988,  ...,  3.3917,  1.8148,  0.1401],
    dtype=torch.float64)])
```
← 606

0.28330519499776763 ← 608 similarity = 1 - distance = 1 - 0.28330519499776763 = 0.7166948050022324 ← 610

---

Match Search Text Selected Word=['hormone' ---> 'estrogen']
Match Search Text Context Window='A hormone in oncology that allows specific cancer cells to grow.'
Matched Document Text='Colditz et al (1995) state that the effect of adding progestins to estrogen therapy on the risk of breast cancer in postmenopausal women is controversial.'

FIG. 6

SELECTION-BASED SEARCHING USING CONCATENATED WORD AND CONTEXT

BACKGROUND

The present invention relates generally to the field of semantic searching of text.

SUMMARY

According to one exemplary embodiment, a method for searching is provided. The method may include receiving a word and a context of the word. The context may include additional words. A first word embedding may be generated by inputting a sequence into a word embedding model. The sequence may include the word and the context. The word embedding model may resultantly output the first word embedding. The word and the context may be concatenated to each other in the sequence. The first word embedding may be compared with other word embeddings. The other word embeddings may have been generated by inputting respective text portions of other texts into the word embedding model. A candidate match of the other texts may be presented. A respective word embedding of the candidate match may be, of the other word embeddings, most similar to the first word embedding according to the comparing. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6 illustrates a cosine distance calculation as part of the text searching according to at least one embodiment;

DETAILED DESCRIPTION

Figure 1:
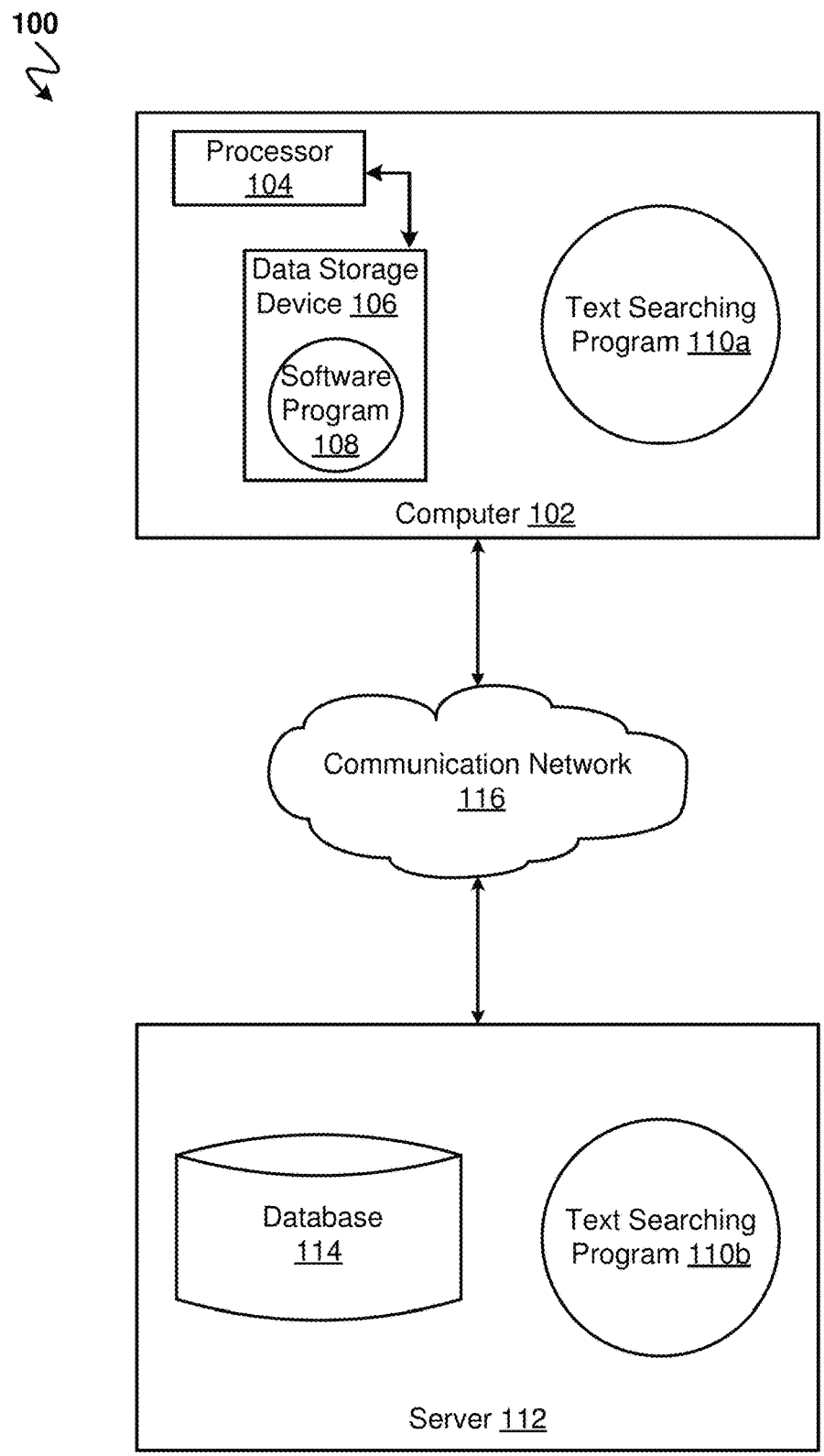
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for semantic text searching. The present embodiments have the capacity to improve the technical field of text searching including document searching, web searching, file searching, and database searching to allow a user to more quickly find documents or other text content that closely relate to search terms that are provided. The improved searching helps the search engine recognize semantically similar words and concepts instead of relying on rote character or letter matching. The widespread adoption of digital technology in industry and society increases the amount of available unstructured data resources. This information increase highlights the need of search engines to continuously refine their disambiguation capabilities between relevant and non-relevant information. Search engines such as IBM Watson® Discovery (IBM and all IBM-based trademarks and logos are trademarks or registered trademarks of International Business Machines Corporation and/or its affiliates) require the capability to precisely interpret search queries and searchable documents based on increasingly subtle semantic differences in order to precisely retrieve the relevant content.

Search engines are software systems that carry out a search through data to obtain relevant information as output for a specific query input. Search is the task of ad-hoc retrieval in information retrieval (IR). The fields of IR and natural language processing have contributed extensive research translating into search engine design in the last decades. After the first search engine introduced a searchable database of ftp filenames, soon large-scale search engines indexed and crawled rapidly growing world wide web resources to produce useful search results based on full text and keyword queues. Nowadays, there are many different approaches on how to design search engines such as keyword search, word embedding based search, and document and sentence embedding based search. In keyword search typically, keywords are entered into a text box and a relevancy is measured by a function of the occurrence of keywords or inflections of the keywords. A main challenge of keyword search is that synonyms cannot be readily found. Systems relying on string comparisons are generally incapable of evaluating the context and the semantic meaning of words in a search query.

The following described exemplary embodiments achieve an improved search technique which retrieves search results with word-level granularity and precision. At least one embodiment achieves an improved searching technique that maintains the capabilities and benefits yielded by deep neural networks such as transformer models including word sense disambiguation and context disambiguation, and multilingualism.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a text searching program 110a. The networked computer environment 100 may also include a server 112 that is a computer and that is enabled to run a text searching program 110b that may interact with a database 114 and a communication network 116. The networked computer environment 100 may include a plurality of computers 102 and servers 112, although one computer 102 and one server 112 are shown in FIG. 1. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communications network 116. The communications network 116 may include connections, such as wire, wireless communication links, or fiber optic cables. As will be discussed with reference to FIG. 7, server 112 may include internal components 702a and external components 704a, respectively, and client computer 102 may include internal components 702b and external components 704b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. According to various implementations of the present embodiment, the text searching program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the text searching program 110a, 110b (respectively) to perform improved searching so that more relevant documents, data entries, or web content are more precisely identified and provided to a searcher. The text searching process 200 is explained in more detail below with respect to FIGS. 2, 3, 4, 5, and 6.

At least some embodiments may include the implementation of a selection-based search engine. A user may select one or several terms of interest in a text, e.g., a phrase, sentence, or entire document, to trigger a search request in order to find best documents from a reference database, which best documents match according to the semantic meaning. The selection-based search includes selected terms of interest in the user query being embedded in a larger text body referred to as context. The context provides additional information for the search query and includes part of the document text that the user did not select as the primary search query. Natural language processing methods which use transformer neural networks may be used to enable the usage of such context. A selection-based search in at least some embodiments may match a query of context-aware embeddings generated by such deep neural networks with indexed context-aware embeddings of a previously ingested document corpus. The disclosure may represent a fine-tuned method of comparing the context of a selected word with various different contexts of various other texts or text sources.

Understanding context is helpful for effective searching, for example, in searching medical literature. Physicians must keep their knowledge up-to-date and might need to consult medical literature on a case-by-case basis to treat their patients. With a new medical article appearing every 26 seconds, finding the most relevant medical literature may be like finding needles in a large haystack. For example, both gynecologists and oncologists may be interested in new research on the hormone estrogen. A typed query search for "estrogen" in the vast medical literature corpus may generate, however, an extensive number of unprecise search results satisfying neither gynecologists nor oncologists. For the gynecologist, literature regarding estrogen during pregnancy is critical. The oncologist regards literature regarding estrogen as a risk factor for cancer to be critical. A context-aware selection-based search for "estrogen" selected in a paragraph on pregnancy by the gynecologist or selected in a paragraph on cancer by the oncologist may specifically recall the search results of interest for the respective medical practitioner. The search query embedding generated for the search query term "estrogen" according to at least some embodiments has used context information, i.e., estrogen as cancer risk, for its generation. Similar embedded terms may be searched out in a lookup database. These terms are similar in the semantic vector space if they somehow refer to estrogen and even more similar if they refer to it in the semantic context of i.e. cancer risk factors. The found terms and their corresponding articles may be ordered by similarity and may be returned as search results to the medical practitioner.

Some further examples in which embodiments of the disclosure may be helpful include:

Web search via web browser: A user may select keywords of interest on a website, which triggers a search of other web sites to find the other web sites containing similar words in the same context.

In operating systems (i.e., Linux, OS X, Windows), an internal selection-based search may locate files and folders with similar textual contents within an operating system.

Domain-specific search: In the legal industry, for instance, a common practice is to search for case-law when constructing legal arguments and lawsuits. Context-aware search after selection of terms in case-law may enable lawyers to find further highly specific case-law hidden in large legal databases. For example, case law regarding "contract cancellation" might be required, but in the very specific context of "consumer contracts in a pandemic".

Another example from the medical literature may include a selection-based search of 'tobacco consumption' in the context of a text on 'heart disease'. The selection-based search can provide contextually and semantically more specific results (e.g. documents on heart issues induced by tobacco consumption).

Figure 2:
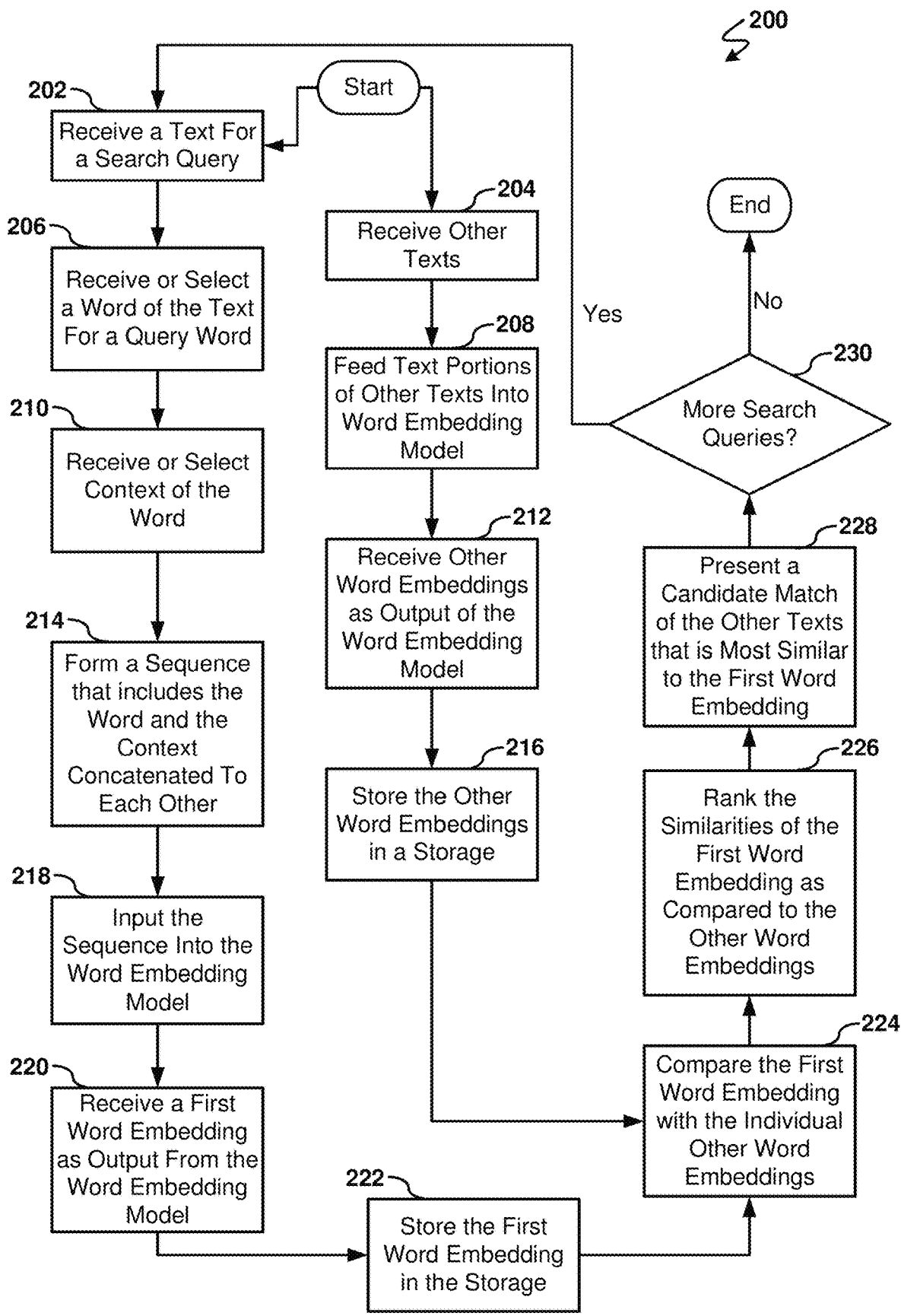
FIG. 2 illustrates an operational flowchart for a process for searching according to at least one embodiment.

Referring now to FIG. 2, an operational flowchart depicts a text searching process 200 that may, according to at least one embodiment, be performed by the text searching program 110a, 110b. It may be appreciated that FIG. 2 provides only an illustration of one embodiment and does not imply any limitations with regard to how different embodiments may be implemented. Many modifications to the depicted embodiment(s) may be made based on design and implementation requirements.

As described in embodiments above, the text searching program 110a, 110b may improve the functionality of a computer by enhancing text searching capability so that a user may more quickly find documents or other text content that are semantically closely related to search terms and context that are provided.

At the start of the text searching process 200, a first path of steps 202, 206, 210, 214, 218, 220, 222 may be performed and a second path of steps 204, 208, 212, and 216 may be performed. These two paths may be performed one before the other or intermittently. Both paths are performed in order to subsequently perform step 224.

In the step 202 of the text searching process 200, a text for a search query is received. The text may be a phrase, a sentence, a paragraph or a text of a passage of a web page or of a document, a text of an entire document, or a text of an entire web page. This receiving of step 202 may include a user typing in text that is received by the text searching program 110a, 110b. The user may type the text into a text window or text box generated by the text searching program 110a on the computer 102 or by the text searching program 110b on the server 112 The user may type text using a keyboard, e.g., the keyboard 726 (see FIG. 7), that is connected to the computer 102 (see FIG. 1) or that is connected to the server 112 (see FIG. 1). The user may type this text by pressing keys of the keyboard 726 which sends signals to the computer 102 of a particular letter, space, or punctuation mark. A user may upload a text into the computer 102 so that the text is received by the text searching program 110a. The text may be sent via the communication network 116 to the server 112 to be reached by the text searching program 110b. A user may use a computer mouse 728 (see FIG. 7) or the keyboard 726 to cut-and-paste a selection of text into a text window or text box generated by the text searching program 110a on the computer 102 or by the text searching program 110b on the server 112. This cut-and-paste text may come from a web page that has been viewed on the display monitor 724 (see FIG. 7) of the computer 102 or of the server 112. The medical journal article 302 shown in FIG. 3 may be an example of a text that is received by the text searching program 110a, 110b in step 202. In another example, the text may be received when a text is loaded in a cache of a processor, e.g., of the processor 104 shown in FIG. 1. The text may be received by a user typing a web page address into a text box of the text searching program 110a. The typing functions may alternatively be performed via speech-to-text functions that occur when the computer, e.g., computer 102 has a microphone connected that can receive audio commands.

Figure 3:
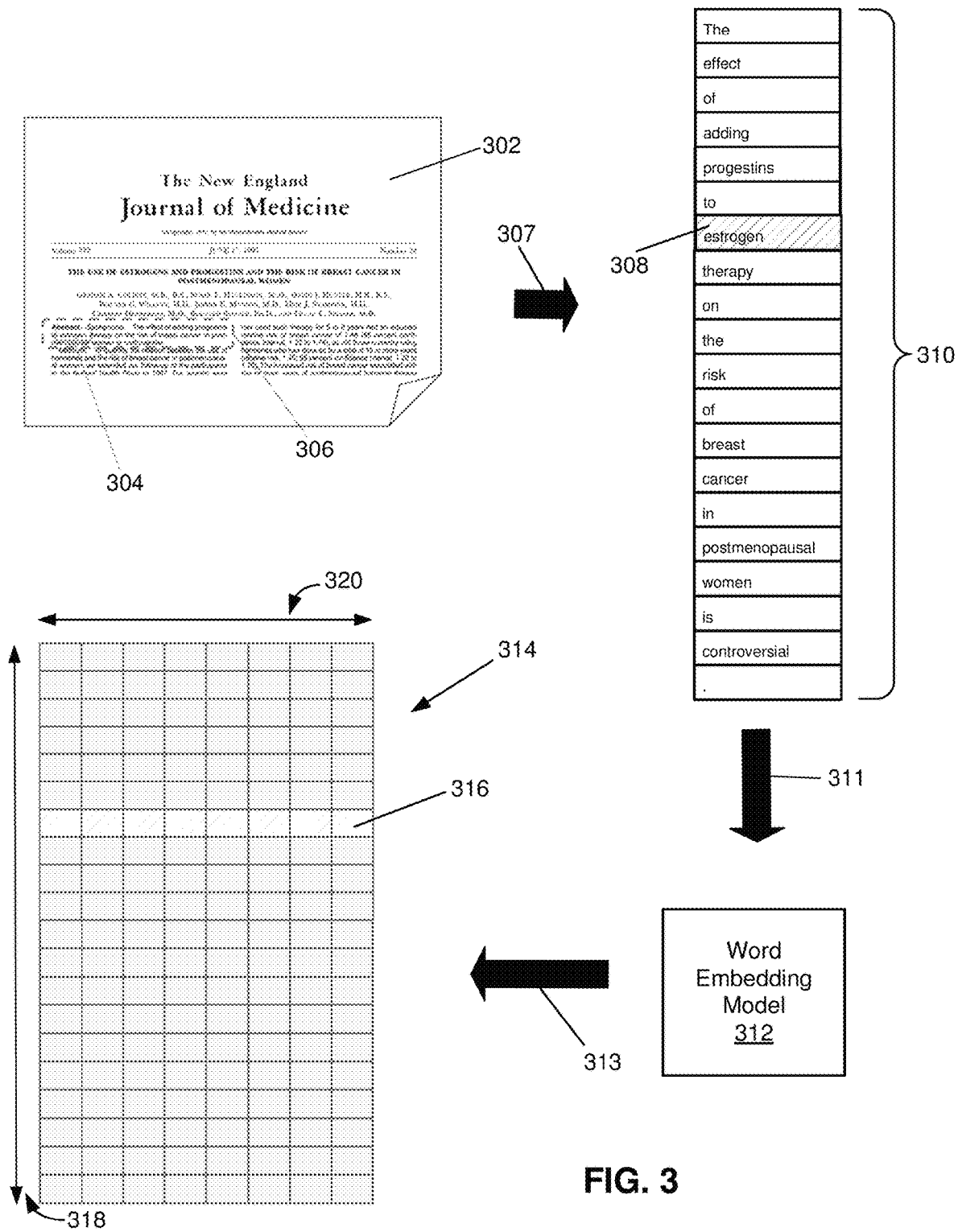
FIG. 3 illustrates a text selection process, a generated sequence, a word embedding model, and a sequence tensor according to at least one embodiment.

In the step 206 of the text searching process 200, a word of the text is received or selected for a query word. In at least some embodiments, this step 206 may include a user selecting one or more words of the text that was received in step 202. This receiving or selecting of step 206 may occur by the user using the computer mouse 728 to highlight and click on a word of the text in a text box/window displayed on the display monitor 724 and associated with the text searching program 110a, 110b and that was received in step 202. FIG. 3 shows a highlighted query word 304, in this case the word "estrogen", that may be received as a part of step 206. This step 206 may alternatively occur as a part of step 202 if a user types the text and the text searching program 110a, 110b has already generated a specialized box of the GUI text window/text box for display on the display monitor 724 of the computer 102. The user in this embodiment would type the text into the specialized box designated to receive a search query word. The display monitor 724 and computer mouse 728 may be connected to the computer 102 or to the server 112. This typing or highlighting and clicking by a user may constitute a manual selecting of the word that is to be the query word.

According to one embodiment, the selecting of the word may include a manual selecting of the word of the search text that is performed by a user who marks, clicks, or hovers over a word in the search text, with the action indicating a selection of that word to be the query word. Manual selection of a query word allows a user to select the word of the search text individually and according to a personal preference.

The term "word" as used above regarding the search query or as used below regarding words for the context may refer to a word that is found in a dictionary of any language or that has an understood meaning to others or that is a sub-word that may be a part of a compound word found in a dictionary. For example, the term "cleaning" may be a word by itself or may be part of the compound word "housecleaning".

Alternatively, after the text is received in step 202 the step 206 may be performed by the text searching program 110a, 110b automatically choosing one or more words of the text that are to constitute the query word. The text searching program 110a, 110b may focus on nouns, verbs, or adjectives in the text for the automated selection and may avoid articles or prepositions or pronouns in the text for the automated selection. The automated selecting may be performed by a processor 104 associated with the text searching program 110a. The processor 104 may access a technical or specialized dictionary which may include the technical vocabulary of a certain field of research, for example general medicine or oncology or gynecology. The processor 104 may by default automatically select all words of the text or search text which are entries in the specialized dictionary. Alternatively, to satisfy step 206 the processor 104 may automatically choose query words based on the prediction of a model, e.g., a machine learning model, instead of content in a dictionary. The model may predict which query words are specifically important to the query text provided by the specific user. If the prediction of the model is above a threshold for a word, that word is selected as one of the query words. The model may be trained and may learn to predict query words based on patterns, for example, i) from a search history of a user, ii) from a personal profile of the user, iii) from a domain of the user iv) from a domain of the query text, and/or v) from a location, time or intention that can be assigned to either the query or to the user. Consent from the user may be obtained in order to use a search history or a personal profile or other information of the user.

In addition to that, manual selecting of the query word in step 206 may in some embodiments be combined with the automated selecting. For example, the word which is selected manually by a user may be weighted higher than the words selected automatically by default. The automatically-selected words may still be used to help perform text searching.

In the step 210 of the text searching process 200, a context of the word is received or selected. In at least some embodiments, this step 210 may include a user selecting additional words of the text that was received in step 202, but not the word or words that were already designated for the search query. This receiving or selecting of step 210 may occur by the user using the computer mouse 728 to highlight and click on additional words of the text in a text box/window displayed on the display monitor 724 and associated with the text searching program 110*a*, 110*b* and that was received in step 202. A user may drag the size or shape of a rectangle or polygon to move over various additional words that are displayed on the display monitor 724 in order to designate the context. FIG. 3 shows a highlighted context section 306 which surrounds the highlighted query word 304 and which may have been selected by the user before or after the user selects the word or words for the search query in step 206. In this instance this highlighted context section 306 reads "The effect of adding progestins to estrogen therapy on the risk of breast cancer in post-menopausal women is controversial." In some instances the text searching program 110*a*, 110*b* may be programmed to discard certain words that fall within the territory of the highlighted context section 306 but are not part of a sentence in which the query word, in this case the highlighted query word 304, lies. For example, the text searching program 110*a*, 110*b* may automatically exclude the words "Abstract" and "Background" from being part of the context since these words float and are not part of any sentence. This step 210 may alternatively occur as a part of step 202 if a user types the text and the text searching program 110*a*, 110*b* has already generated a specialized "context" box of the GUI text window/text box for display on the display monitor 724 of the computer 102. The user in this embodiment would type the text into the specialized box designated to receive a context. The display monitor 724 and computer mouse 728 may be connected to the computer 102 or to the server 112. This typing or highlighting and clicking by a user may constitute a manual selecting of the additional words of the text that are to be the context for the query word.

By allowing a manual selection of the query word or words and of the context, user advantages may be achieved that a human may use professional or experienced judgment to decide to which extent words surrounding the selected word may contribute to the context.

Alternatively, after the text is received in step 202 the step 210 may be performed by the text searching program 110*a*, 110*b* automatically choosing one or more additional words of the text to constitute the context. The text searching program 110*a*, 110*b* may focus on capturing a complete sentence or paragraph in which the query word falls. In this instance, the number of words in the context that precede the query word or words may be greater or less than the number of words in the context that follow the query word or words. The text searching program 110*a*, 110*b* may alternatively automatically capture the context by choosing an equal number of words that precede and follow the query word or words. This number of equal words before and after may be preset by a user in the system for automatically selecting the context. For the purposes of this disclosure, the term context refers to words that are in the same text or text portion as the query word. Likewise, a user may preset an unequal number of words for the context before and after the query word or words. With the automated selecting, the user does not have to select the context which may simplify the text searching process 200. Thus, in one example, the context may be provided in an automated manner in response to the user selecting one of the word or words of the text as the query word or words. In response to selecting the selected word, boundaries, i.e. a beginning and an end, of the context may be defined on the basis of the selected word. Defining the boundaries of the context may be considered as receiving or selecting the context in one example. An automated selection of the context may include an aggregation of additional words of the text surrounding the query word.

The word selected in step 206 may be embedded in a body of the text that is received in step 202. The words of the search text that surround the selected word may be considered as a context of the selected word. The context, and the order of the words in the context, with respect to each other and with respect to the query word or words may provide information regarding the semantic meaning of the query words or word. Hence, the context of the selected word may provide additional information regarding the meaning of the text.

The query word and the context together may constitute all of the words of the text that is received in step 202 or may be a subset or portion of the text that is received in step 202.

In the step 214 of the text searching process 200, a sequence is formed. The sequence includes the word and the context being concatenated to each other. The concatenation may include a linking of the selected query word to the context words. This concatenation of context to query word embedded within the context may result in an enriched query. The text searching program 110*a*, 110*b* may concatenate the word and the context to each other. FIG. 3 shows that after the first transition 307 that a selected sequence 310 has been formed. The selected sequence 310 includes both the highlighted query word 304 and the highlighted context section 306. The highlighted query word 304 "estrogen" appears in the selected sequence 310 in the query word row 308. The query word may typically fall in a position in the sequence that corresponds to the position of the query word within the context and/or within the received text. In this instance, the query word is in a seventh sequential index position of the selected sequence 310. The text searching program 110*a*, 110*b* may automatically perform this formation of the sequence based on the inputs received in steps 202, 206, and 210 by using word processing techniques.

The sequence may represent an order of the words including the query word or words and the additional words of the context as they appeared in the text. Thus, the entries of the word embedding or vector that is formed subsequently in steps 218 and 220 may be ordered in accordance with the order of the words of the sequence. The order of the words of the text received in step 202 may be a feature of the context of the selected word. By presenting, in the form of the order of the entries of the word embedding or vector, the order of the words of the text, this feature of the context of the selected word may be used for generating the query word embedding or the query word vector. Hence, the entries of the query word embedding or vector may be dependent on the order of the words of the text and as a consequence dependent on the context of the selected word. These dependencies may enable a context of the selected word to be more precisely captured via the query word embedding or vector.

The formation of the sequence in step 214 may include filtering pre-selected words from the sequence before inputting the sequence into the word embedding model 312. Certain expletive words or word types such as prepositions, definite articles, indefinite articles, hanging words, or punctuation marks may be filtered, e.g., removed, from the sequence before the sequence is passed into the word embedding model 312.

In the step 218 of the text searching process 200, the sequence is input into a word embedding model. FIG. 3 shows that as part of a second transition 311 the selected sequence 310 is fed or input into the word embedding model 312. The word embedding model 312 may include a neural network architecture. The word embedding model may be generated by using a transformer-based machine learning technique for natural language processing. In one example, the word embedding model may be trained using a bidirectional encoder representation from transformers (BERT) learning technique. Such a training may be performed using a database of texts, such as open-collaborative online encyclopedias such as Wikipedia®.

Word embeddings for a text sequence may in practice include a few hundred to a few thousand dimensions. Word embeddings may be an instance of distributed representation, with each word being its own vector or one-dimensional vector. In word embeddings, based on the machine learning, words with similar meanings may be generated to have similar vectors. An embedding model may be a machine learning model with one or more embeddings. The embedding model may include or be part of a neural network, a recurrent neural network, a shallow neural network, a deep neural network, a vector adding machine, and/or a generative adversarial network (GAN). Word embeddings may be a dimensional space that may include vectors. When the words from the text sequence, text portion, or text body are represented as vectors in the dimensional space, mathematical operations may be performed on the vectors to allow quicker and computer-based comparison of text corpora. The word embeddings may also reflect the size of the vocabulary of the respective text sequence or text portion fed into the embedding model, because a vector may be kept for each word in the vocabulary of the text sequence or text portion that is fed in. This vocabulary size is separate from the dimensionality. For example, a word embedding for a large text sequence may have one hundred dimensions and may have one hundred thousand respective vectors for one hundred thousand unique words. The dimensions for the word embedding may relate to how each word in the text sequence relates to other words in the text corpus.

Access to the word embedding model 312 may be obtained by establishing a connection between a query server and a word embedding server that hosts the word embedding model 312. In this case, the access to the word embedding model 312 may be considered as an external access with respect to the query server. The query server may provide the text and may process the selecting of the word or words of the search text to be the query word, while the word embedding server then performs the word embedding. The query server may send a password or a request to the word embedding server for verification before access is granted. The request may request computing resources on the word embedding server. The query server may constitute a communication server or another server that is a communication server may be used to help gain the external embedding model access.

These word embeddings may be based on one or more of word position, count, and context for the vocabulary of the text sequence or text portion. A word embedding that is based on all of word position, count, and context may provide the greatest semantic searching power but may also require the most computational power. The positional basis may be excluded in some embodiments to reduce the required computing power. Storing the position of terms helps speed up the processing time, as it reduces a need to analyze and go through the sentence several times.

According to at least one example, access to the word embedding model 312 may be obtained by calling a routine for initializing the word embedding model 312. In this case, the word embedding model 312 may be stored on a local server and may be realized by a processor on the local server actuating performance of the word embedding. Here, the access to the word embedding model 312 may be regarded as an internal access with respect to the query server. This local access may include having availability of functionalities of the word embedding model 312 for a main program running on a processor, e.g., the processor 104 or 706 on the local computer.

In some embodiments, a sequence may be sent to an external word embedding model. Alternatively, information about or a pointer to a memory location, e.g., within a RAM or a cache, of a sequence may be sent to a word embedding model 312, and the word embedding model 312 may use the memory location or pointer to access the sequence and to process the sequence.

Figure 4:
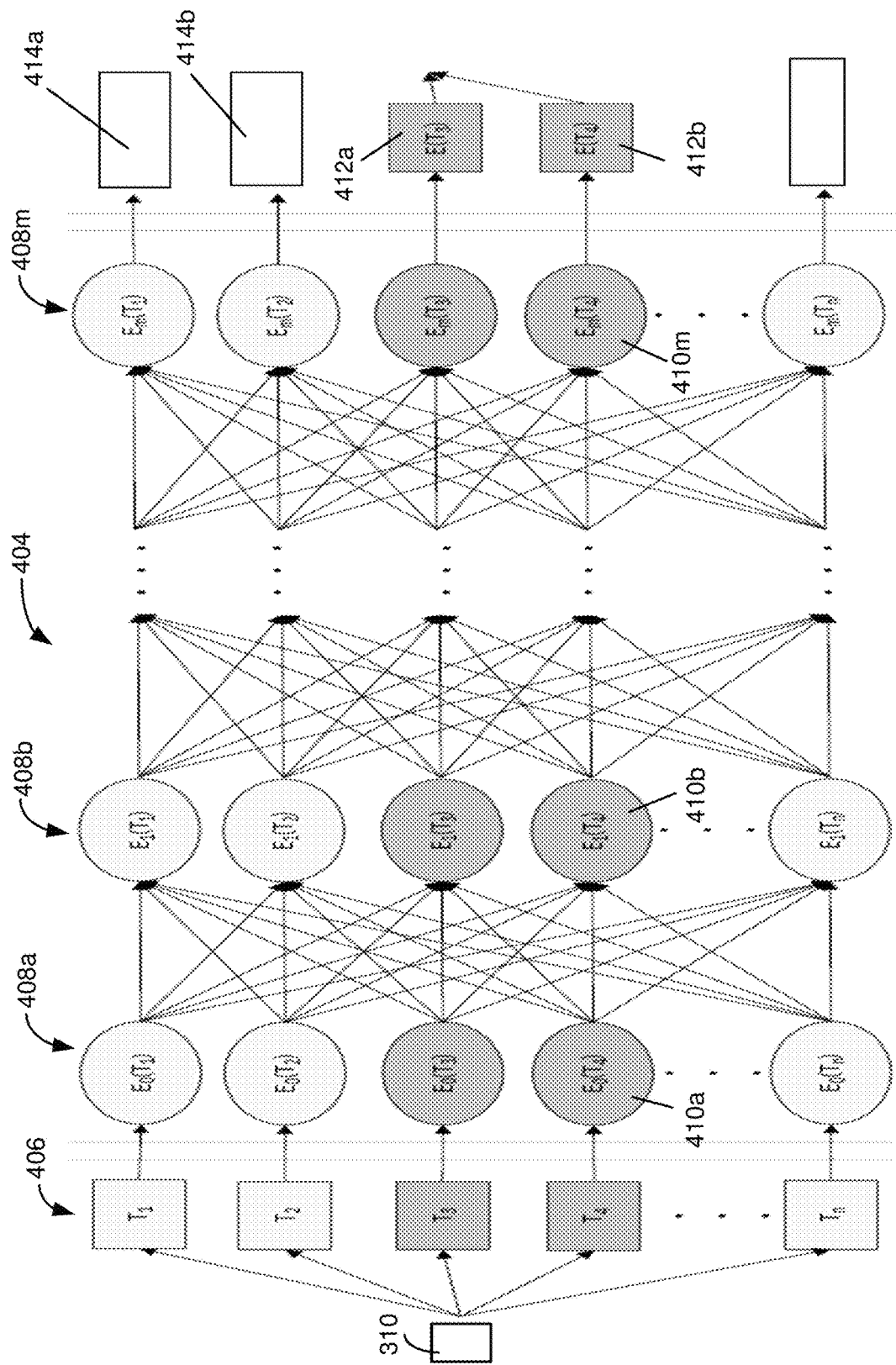
FIG. 4 illustrates a neural network implemented in at least one embodiment.

The neural network of the word embedding model 312 may be a transformer neural network, e.g., an attention-based transformer neural network. Such a transformer neural network may include one or more encoders and decoders that include hidden layers and thereby constitute a deep neural network together or separately. The encoder and the decoder may be able to translate an input first text portion or message into a second text portion or second message. By training the decoder and the encoder together, words may be captured by each deep neural network. For example, for translating an input word a first internal vector with real entries may be calculated as an output vector of one of the deep neural networks, i.e. the neural network representing the encoder, for representing a sense or meaning of that word. The other one of the deep neural networks, i.e. the one representing the decoder, may compute a second vector or second embedding as an output vector or output embedding of that network on the basis of the first internal vector or first internal embedding. The output may represent the translation of the input word or words into the second meaning or language. In order to build word embeddings, the first internal embedding may represent the input query word but additionally the context of the query word. Hence, the encoder may be used to generate word embeddings or word embedding vectors. After the training of the decoder and the encoder, the decoder and the encoder may be split from each other. The trained encoder, the trained decoder, or both may be a part of the neural network architecture of the word embedding model 312 and may be used to generate word embeddings or vectors on the basis of an input text. FIG. 4 which will be discussed subsequently shows an example of a neural network implemented in at least one embodiment and that includes multiple layers. In some embodiments the transformer neural network may compute a vector in an individual layer of its multiple layers based on a relative importance weight for an embedding generated from a previous or preceding layer of the layers. This usage of the relative importance weight may occur due to the attention mechanism or attention layers within the transformer neural network.

The word embedding model 312 may map the input into a continuous vector space. As will be discussed with respect to FIG. 4, the word embedding model 312 may use the context and the query word concatenated together so that the word embedding or word embedding vector representing the query word or words is influenced by the context words as well as by the query word. In some embodiments, the context of the selected word may be weighted much higher than the selected word itself when the word embedding model 312 generates an output embedding or output vector, which may lead to a more non-biased selection result with respect to the selected word.

Word embedding models may have a dimension for their input space that is higher than a dimension of their output space given by the continuous vector space. Thus, feeding the word embedding model may cause a reduction of dimensionality of the words or word representations that are fed into the model. As the dimension of the output space may be lower than the dimension input space, a mapping of a discrete representation of the words of the sequence to the continuous vector space may be considered as a projection of the discrete representation of the words of the sequence to the output space. This projection may be considered as a classification of discrete representation of words of the sequence to a point or a subspace of the output space. By performing such a classification, the context of the selected word may be assigned to that subspace.

In at least some embodiments, the inputting of the sequence into the word embedding model 312 in step 218 will include inputting a discrete representation of the sequence into the word embedding model 312. The words of the sequence may be represented in a discrete manner via a discrete representation.

The discrete representation of the sequence may be a vector that includes integer values as entries of the vector. The integer values may be equal to one or zero or may be equal to a number indicating each word of the sequence as an entry in a dictionary or in a list of vocabularies. In the case where the integer values represent entries in a saved dictionary, the vector may be referred to as "one-hot-vector".

The discrete representation of the words of the search text may be in the form of respective numbers for the words of the text. The respective numbers may be obtained by using a dictionary of the word embedding model 312.

According to one embodiment, the discrete representation of the words of the text and/or sequence may be a discrete representation of textual elements. The textual elements may include characters. The textual elements as a whole may represent the words of the text and/or sequence as a whole. A number of the textual elements may be higher than a number of the words of the search text. A length of each textual element may be different from a length of a respective syllable which constitutes the respective textual element. In one case, a scope of one or more textual elements may deviate from a scope of any syllable. In another embodiment, each textual element may be equal to a syllable of the words of the text and/or sequence. The discrete representation of textual elements may increase the possibility that the words of the text and/or the sequence may be represented accurately by a discrete representation, given limited resources for providing the dictionary or a list of indexed textual elements. For example, a number of required syllables for expressing the words of the text may be lower than a number of required words for expressing the words of the text.

The text searching program 110a, 110b may generate a discrete representation of the words of the sequence of the text on the basis of the words and a dictionary of the word embedding model 312 or a list of indexed textual elements of the word embedding model 312. The discrete representation of the words may be in the form of a representative vector. The individual vectors may be generated such that first entries in these vectors may each indicate an index of one of the words of the search text according to the dictionary. The discrete representation of the words of the search text may be a discrete representation of textual elements. The textual elements may include characters. The textual elements may each represent a respective part of the words of the search text by their characters or by their syllables. In one example, the representative vectors may be generated such that the first entries may each indicate an index of one of the textual elements according to the list of indexed textual elements of the word embedding model 312.

Apart from the first entries, the representative vectors may include further entries which may be void. This use of void entries may enable the representative vectors to have a prescribed length. The word embedding model 312 may be configured such that the input or input vector it requires has a prescribed length.

Generally, the discrete representation of the words of the search text may occur such that the word embedding model 312 may be capable of processing the discrete representation of the words of the search text. In one example, the word embedding model 312 may require a first type of input vectors in which each element represents a single word. In another example, the word embedding model 312 may require a second type of input vectors in which each element represents a single textual element of the list of indexed textual elements of the word embedding model 312, for example a single syllable.

An order of the words of the text and/or sequence may be represented by an order of the discrete representation. For example, the entries of the vector may be ordered in accordance with the order of the words of the search text and/or the sequence. The order of the words of the text may be a feature of the context of the selected word. By presenting the order of the words of the text in the form of the order of the entries of the vector, this feature of the context of the selected word may be used for generating the query word embedding or vector. Hence, the entries of the query word embedding or vector may be dependent on the order of the words of the text and consequently dependent on the context of the selected word. These dependencies may enable the query word embedding or vector to more precisely capture the context of the selected word.

In the step 220 of the text searching process 200, a first word embedding is received from the word embedding model as the output of step 218, i.e., as the output of feeding the sequence into the word embedding model.

According to one embodiment, the query word embedding or vector may be generated on the basis of the query word itself and on the on the basis of words of the text immediately surrounding the selected word. Generally, the words of the sequence may be a subset of all the words surrounding the selected word. For example, a preposition, a specific article, or an indefinite article may be not included for the sequence. However, the preposition, the specific article, or the indefinite article may contribute to indicate more precisely the context of the selected word, especially if the selected word is immediately surrounded by the preposition, the specific article, or the indefinite article respectively. The text searching program 110a, 110b may in some embodiments automatically include such preposition, specific article, or indefinite article for the sequence that is input into the word embedding model 312. Consequently, according to this embodiment, the context of the selected word may be captured more precisely via the query word embedding or vector.

The word embedding that is received may be a vector and/or a tensor. Entries of the vector and/or tensor may represent words of the sequence or may represent textual elements, for example syllables, of the words of the sequence. Tensors or concatenated matrices may be constructed such that the values of each row may each be computed as averaged or summed values of values of respective several rows respectively. The respective several rows may together represent respective several textual elements which as a whole may represent a respective single word of the sequence. This tensor may in some instances be referred to as a query matrix which includes l rows and k columns. A number of the rows l of the query matrix may be equal to a number of words or textual elements of the sequence. The number of columns k of the query matrix may be equal to the dimension of the continuous vector space.

The query word embedding vector for the query word of step 206 may be equal to one row of the query matrix. More precisely, the query word embedding vector of the query word may be equal to an i-th row of the query matrix, with the query word being the i-th word of the sequence. In at least some cases, the query word may be the central word in the sequence. FIG. 3 shows that after the third transition 313 a query word embedding 314 has been generated by the word embedding model 312. The query word embedding 314 has rows 318, with a number of these rows 318 corresponding to the words or text elements of the selection sequence 310, which in this instance is twenty. The query word embedding vector has columns 320 corresponding to the dimensions of the continuous vector space used by the word embedding model 312, which in this instance was eight. FIG. 3 shows that a query word row 316 is in the position amongst the rows 318 that corresponds to the position of the query word row 308 in the selection sequence 310.

In one example, entries of discrete representations of the words of the sequence may each indicate an index of one of the textual elements of the sequence according to the list of indexed textual elements of the word embedding model 312. In this case, each syllable of the query word may be assigned to a row of the query matrix. The query matrix may be read in and the query word embedding or vector of the query word may be generated as an averaged or summed vector of all the rows that are assigned to one syllable of the query word.

FIG. 4 illustrates a deep neural network 404 implemented in at least one embodiment as part of the word embedding model 312. The deep neural network 404 may be a transformer neural network. As part of step 218, input tokens 406 may be input into the word embedding model 312 and into the deep neural network 404. FIG. 4 shows the input tokens 406 coming from the selection sequence 310. The input tokens may be generated with one input token for each word of the sequence or the selection sequence 310. Alternatively, an input token may be generated for other individual parts of the sequence such as syllables or character portions of the words of the sequence or for portions of compound words of the sequence. The input tokens 406 are fed into the deep neural network 404 first into a first layer 408a of input token embeddings. The first layer 408a includes input token embeddings for each of the input tokens. For example, the first layer 408a includes a query word input token embedding 410a that corresponds to the query word of the selection sequence 310, in this instance which corresponds to the word "estrogen" (see FIG. 3) or to a token that is part of or formed by the word "estrogen". The first layer 408a may be considered a preceding or previous layer as compared to the second layer 408b.

After the first layer 408a processes the input tokens, the first layer 408a sends output embeddings to a second layer 408b of the deep neural network 404. The deep neural network 404 has fully connected attention layers so that each token embedding of a particular layer is used to influence the calculation of the token embedding of a particular word for the next layer. Thus, all input token embeddings of the first layer 408a, including the query word input token embedding 410a, are used to calculate the second layer input token embedding 410b within the second layer 408b and again corresponding to the query word. The second layer 408b may also be referred to as a first hidden layer of the deep neural network 404. There may be a total of m layers within the deep neural network 404 so that 408m designates the final layer of the deep neural network 404. This use of all tokens in each layer to generate or calculate an individual token of the subsequent layer occurs through each layer of the deep neural network 404, including for the final layer query word token embedding 410m. Thus, the context of a sequence helps influence the calculation of an output embedding for a query word which is also part of that sequence. A query word embedding 412b is generated as output of the deep neural network 404. Other output embeddings such as the first and second output embeddings 414a, 414b are discarded from the text searching process 200 as being irrelevant, because the query word embedding 412b will be used for comparison to embeddings of text portions of the other texts. In some instances where a query word includes multiple words or multiple tokens so that an additional query word embedding 412a is generated, the final output query word embedding may be formed from combining the query word embedding 412b and the additional query word embedding 412a. In some embodiments a final output query embedding may be formed by combining outputs, e.g., vector representations, generated by multiple layers of the neural network, e.g., from a first layer and a second layer. This combining may include an averaging, a summing, a concatenating, or any other merging of the outputs for an individual token from the particular layers. Using the context words linked to the query word that was embedded within the context words results in more meaningful and relevant search results that would occur if the query word and the context words were searched with separate submission to an embedding model. This linking simplifies and reduces computational requirements that are required as compared to a separate submission of the query word and the context words to the embedding model.

Embeddings may be multi-dimensional numerical vector representations that contain a semantic meaning of a token in its context based on the pre-trained weights in the embedding model, e.g., in the deep neural network 404. The weights, after pre-training, may also be additionally domain-adapted to a specific domain, e.g., to medical texts, or fine-tuned for a specific task at hand, e.g., classification, entity recognition, text similarity prediction, etc. In some embodiments, the other texts may be scored individually by receiving an average score across the output scores for all possible query words contained within that particular other text.

In the step 222 of the text searching process 200, the first word embedding is stored in a storage. This storage may occur in a storage of the computer 102 or in the server 112 or in another computer or another server.

As part of the second path towards the comparison of step 224, in the step 204 of the text searching process 200, other texts are received. The other texts, like the text received in step 202, may be a phrase, a sentence, a paragraph or a text of a passage of a web page or of other documents. The other texts may be entire documents or entire web pages, respectively. In one example, the other texts may be from a different source than that of the text received in step 202. Alternatively, as the first text (received in step 202) and the other or second text (received in step 204) may each be a paragraph, it may be possible that the first text and the other or second text are from one common text source, for example from one single document or from one single web page.

In the step 208 of the text searching process 200, text portions of the other texts are input into the word embedding model 312. In some embodiments, these text portions may be sent to an external word embedding model. Alternatively, information about or a pointer to a memory location, e.g., within a RAM or a cache, of these text portions may be sent to a word embedding model 312, and the word embedding model 312 may use the memory location or pointer to access the text portions and to process the text portions. The words of the text portions may be linked, e.g., concatenated, to each other when they are sent to the word embedding model 312. Such information may be sent regarding multiple locations if multiple other texts are to be compared, but some of those multiple other texts are stored in different locations.

Determining a text portion of the other texts to input into the word embedding model 312 may include steps that are similar to steps 206, 210, and 214 that prepared the sequence from the text of step 202 to feed to the word embedding model 312. As the word embedding generated and received in step 220 may capture the context of the query word, the other word embeddings generated and then received in step 212 may also capture contexts of words of the other texts. Step 208 may include inputting discrete representations of the words of the text portions of the other texts into the word embedding model 312. The words of the text portions of the other texts may include the selected or received word from step 206 or a synonym of that selected word. In addition, the words of the text portions may then include context of that selected or received word or synonym. The text searching program 110a, 110b may automatically scan the other texts to search for instances of the selected or received word and/or for synonyms of that word or other words similar to the query word. The text searching program 110a, 110b may access a saved thesaurus to identify synonyms of the word. The text searching program 110a, 110b may then automatically select a size for the text portions, with respect to a number of words, sentences, or syllables, that equals the size of the equivalent that was present for the sequence fed into the word embedding model 312 in step 218. The text searching program 110a, 110b may feed randomly selected text portions of the other texts into the word embedding model in step 208 or may feed multiple text portions, with each of the multiple text portions being based around a particular word of the text portion of the other texts, but using the query word from step 206 or a synonym of the query word or a similar word to the query word may help to more quickly perform the text searching process 200 and to more accurately find relevant other texts. This equivalent may be performed multiple times for the various other texts that are to be considered as possible relevant matches for the search. Synonyms or similar words may be useful because their context may be similar to a context of the query word. Therefore, this embodiment may enable to find the text portions that are most similar to the sequence, because the other word embeddings or other word embedding vectors may be most similar to the word embedding or the word embedding vector from the text portions identified using a synonym, a similar word, or even the query word itself.

The words of the other text documents may be processed in preparation for feeding or inputting into the word embedding model 312 by analyzing each word of the text portion one-by-one, independently of how many times a particular word may appear in the text portion. If the same word appears several times in the text portion, a different word sequence will be prepared or generated for each of the various appearances of that word.

In some embodiments, the text searching program 110a, 110b may skip some words of the text portion or of a sequence if those words are found on a block list. A user may manually pre-adjust words on a block list for the searching program 110a, 110b. For example, expletive words may be on a block list and the text searching program 110a, 110b may decline to generate word embeddings for those expletive words. This skipping may be a filtering of pre-selected words from the sequence before inputting the sequence or text portion into the word embedding model 312. Certain expletive words or word types such as prepositions, definite articles, indefinite articles, hanging words, or punctuation marks may be filtered, e.g., removed, from the sequence or text portion before the sequence or text portion is passed into the word embedding model 312.

Different sets of words of one particular other text may be fed or input into the word embedding model 312 in order to check for relevancy of any of these sets of words to the search sequence.

The text searching program 110a, 110b may use word processing techniques or natural language processing (NLP) to generate sequences or text portions to be ready to send to and feed to the word embedding model 312.

Figure 5:
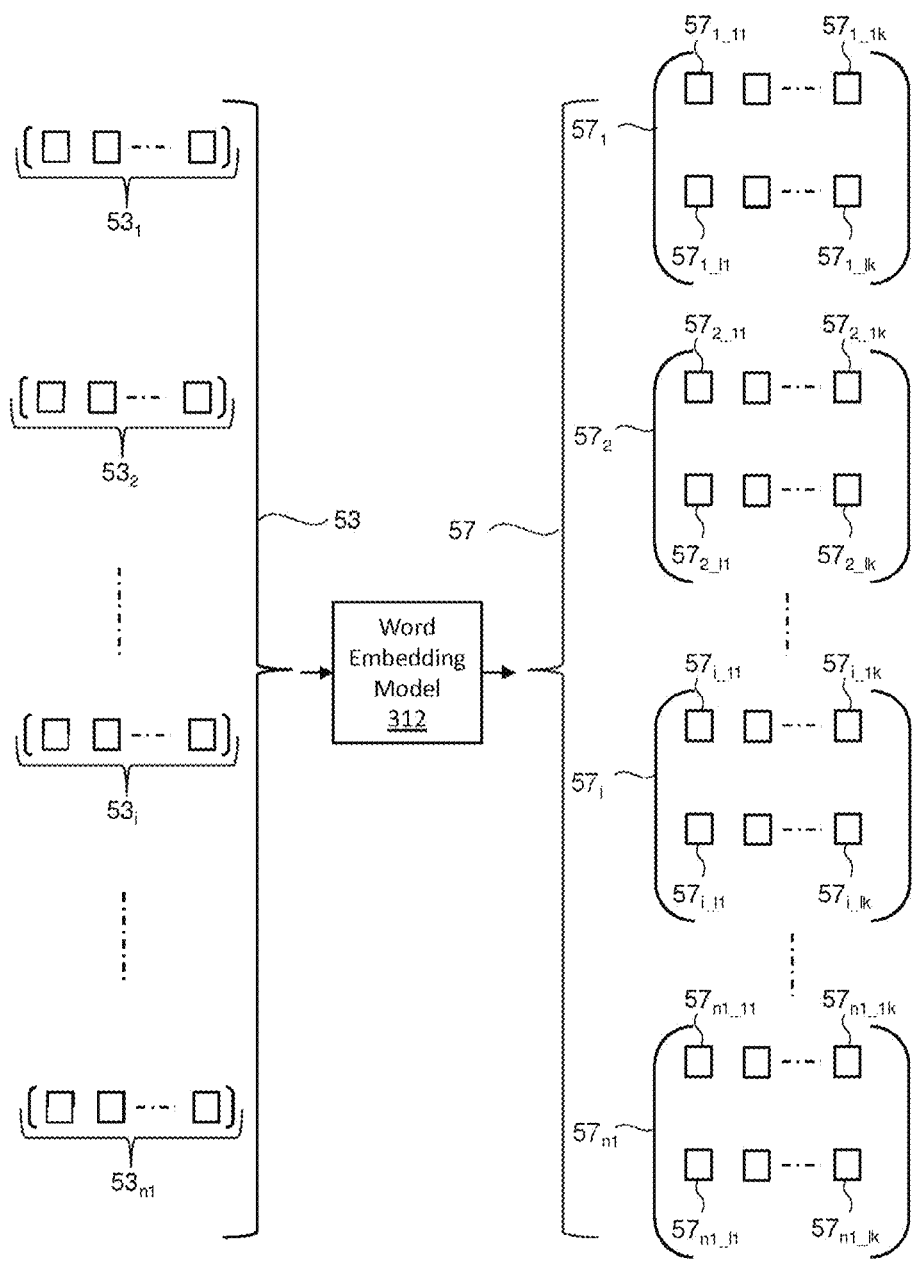
FIG. 5 illustrates the use of discrete representations by a word embedding model to generate a tensor of matrices according to at least one embodiment.

Like for step 218, this inputting or feeding of step 208 may include inputting or feeding a discrete representation of the text portions of the other texts into the word embedding model 312. FIG. 5 shows a set 53 of representative vectors of discrete representations. The individual representative vectors include first representative vector $53_1$, second representative vector $53_2$, additional representative vector $53_k$, and last representative vector $53_{n1}$. Each vector of the set corresponds to a respective text portion or word sequence of another text or of a set of other texts. The text searching program 110a, 110b may generate a discrete representation of the words of these text portions on the basis of the words and a dictionary of the word embedding model 312 or a list of indexed textual elements of the word embedding model 312. The discrete representation of the words of the text portions of the other texts and in the form of representative vectors may be generated such that first entries in these vectors may each indicate an index of one of the words of the search text according to the dictionary. The discrete representation of the words of the text portions of the other texts may be a discrete representation of textual elements. The textual elements may include characters. The textual elements may each represent a respective part of the words of the text portions of the other text by their characters or by their syllables. In one example, the representative vectors may be generated such that the first entries may each indicate an index of one of the textual elements according to the list of indexed textual elements of the word embedding model 312. Each word or textual element of the text portions of the other texts may be mapped by the text searching program 110a, 110b to a corresponding index of the vocabulary of the word embedding model 312 or the list of indexed textual elements of the word embedding model 312 respectively. Each discrete representation of may be in the form of a corresponding representative vector $53_1$ to $53_n$ that represents one of the word sequences or text portions of the set 53. These corresponding representative vectors may each include the corresponding indices of the words or textual elements of the corresponding text portion or word sequence as entries.

Apart from the first entries, the representative vectors for these other texts may include further entries which may be void. This use of void entries may enable the representative vectors to have a prescribed length. The word embedding model 312 may be configured such that the input or input vector it requires has a prescribed length.

The other texts may be accessed from a saved database or from a scan of the world wide web that is performed by the text searching program 110a, 110b. The saved database may be saved in the data storage device 106 of the computer 102 or in the database 114 of the server 112 or in another computer memory.

In the step 212 of the text searching process 200, other word embeddings are received from the word embedding model 312 as the output of step 208, i.e., as the output of feeding the text portions of the other texts into the word embedding model 312. The word embedding model 312 that is implemented in steps 208 and 212 may be the same embedding model 312 used in steps 218 and 220, i.e., the same model operating on the same servers, or may be a different instantiation of the same model, i.e., have the same origin but be operating on different servers than that/those on which the embedding model 312 for the sequence operates. Each word embedding or vector may be generated using the word embedding model 312 on the basis of a different set of words of a particular other text source.

As the output space is continuous and the subspace may include a certain extension in the output space, these other word embeddings or other word embedding vectors may allow a semantic comparison of the sequence to the text portions of the other texts. If the embeddings or vectors are assigned to the same subspace within the output space by using the word embedding model 312, the context of the selected word and the context of the base word of the text portions of the other texts may be regarded as similar. Hence, the exemplary text may be similar to the text received in step 202 and may therefore be relevant for a user who is using the text searching program 110a, 110b to perform searching.

The word embedding model 312 may be configured to generate a respective matrix $57_i$ corresponding to one representative vector $53_i$ of a discrete representation of the set 53 of discrete representations on the basis of the respective discrete representation. A number of discrete representations of the set 53 of discrete representations may be equal to $n_1$. Each matrix $57_i$ may include l rows and k columns, with each single element of the matrix $57_i$ being indicated by a respective number of the rows l and a respective number of the columns k of the matrix $57k$. A number of the rows l of the matrices $57_i$-$57_m$ may be equal to a number of words or textual elements in each text portion that is used as part of a text portion set and for which discrete representations are generated, e.g., in set 53. A number of columns k of the matrices $57_i$-$57_m$ may be equal to a dimension of the continuous vector space. The continuous vector space is referred to as the output space and may be considered as a context space and/or a latent space. The latent space may be spanned by a vector basis of latent vectors. Each latent vector may be considered as representing one feature for representing an exemplary context given by an exemplary vector of the latent space. The matrices $57_i$-$57_m$ together may form a first set of matrices. In one example, the number of the rows l of each matrix $57_i$ may differ from each other. This may occur if the length of the word sequences of the text portions differ from each other. Multiple such sets of matrices may be created when multiple other text sources, e.g., when all other text sources saved in a database, are being analyzed and searched or compared to the query sequence. The word embedding model 312 may generate each matrix one by one by processing the discrete representations one by one.

Matrices may be stored in a database, e.g., in the database 114. Tensors may be examples of the matrices. The text searching program 110a, 110b may store the entries of the matrices and entries of the discrete representations in a structured manner such that each entry of each representative vector of discrete representations may be assigned to one row of one of the matrices. For example, a first tensor and a second tensor may be generated that include a first set of matrices and a second set of matrices respectively, with a first set of discrete representations being assigned to the first tensor and a second set of discrete representations being assigned to the second tensor. In another example, a first and second concatenated matrix may be generated on the basis of a first set of matrices and a second set of matrices respectively. The first and second concatenated matrix may include the rows of the first set of matrices and the second set of matrices respectively. The values of each row of these tensors or these matrices may each be computed as averaged or summed values of values of respective several rows of the matrices of the first and second set of matrices respectively. The respective several rows may together represent respective several textual elements which as a whole may represent a respective single word of the text portions of the other texts or other text sources.

A similar process as described above with respect to FIG. 4 and with respect to steps 218 and 220 in the first path would be performed for each text portion of the other texts, e.g., for steps 208 and 212 of the text searching process 200. For better matching with the query word embedding 412, the text portion may be chosen to have a text portion sequence with the same number of words or tokens as are present in the query word sequence, e.g., in the selection sequence 310. Using consistent sizes for the inputs for the other texts as compared to the search sequence of search text will result in improved comparison of the embeddings and/or vectors and will result in improved granularity for the result. Fewer false matches will be generated.

In the step 216 of the text searching process 200, the other word embeddings are stored in a storage. This storage may occur in a storage of the computer 102 or in the server 112 or in another computer or another server.

In the step 224 of the text searching process 200, the first word embedding from steps 220 and/or 222 is compared with the individual other word embeddings from steps 212 and/or 216.

According to one embodiment, the performing of the comparison may include calculating a measure for assessing a similarity between the query word embedding or vector of the selected word or the query word and the word embedding or vector generated from the text portions of the other texts. The measures for the various other texts may then be compared, e.g., by quickly comparing scalar values, to determine which of the other texts is most similar to the search text.

According to at least one embodiment, the first measure may be the various distances between the query word embedding or vector of the selected word and various points represented, respectively, by the other word embeddings or vectors from the text portions of the other texts. Using the various distances each as a measure may have the advantage of being intuitively understandable by humans.

According to at least one embodiment, the measure may be various cosine distances between the various other word embeddings or vectors and the query word embedding or vector of the selected word. Using the first and the second cosine distance each as a measure may have the advantage to weigh different directions of the various word embeddings or vectors more than their length, as was described above for the distance measurements. A direction of other word embeddings or vectors in the output space may be understood as a certain context represented by the other word embeddings or vectors.

A similarity of the respective word embeddings or vectors may be checked by determining an angle, for example a cosine distance, between the respective word embeddings or vectors or between a distance between points that are represented by the respective word embeddings or vectors in the continuous vector space. The angle or the distance may be compared with a given threshold. Other vector or tensor or embedding distance metrics may be used for the comparison.

According to at least some embodiments, the text searching process 200 may further include recognizing and marking one or more of the other texts or other text sources as a match to the search text or sequence if the differences between the measures are smaller than a first threshold.

This comparison of step 224 may be considered as a comparison of the context of the query word from the search text with a context of the selected word or a synonym from the other texts. This comparison may be performed in an abstract form, for example by comparing real entries of the respective word embeddings or vectors. Similar word embeddings or vectors may be considered to represent similar context. For that reason, the selecting of the most similar other text, e.g., the selecting of a candidate match, on the basis of the result of the comparison of the word embeddings or vectors may be considered as a selection by context. If the selection may be performed by context, the selection may provide more appropriate results, i.e. a more appropriate text with respect to the search text, as compared to a word selection that does not include semantic contextual meaning.

The comparison of the query word embedding or vector of the selected word with the word embedding or vector of the other texts may involve determining a cosine distance between the query word embedding vector of the selected word and the first word embedding vector. If this cosine distance for one of the other texts is less than a given first distance threshold, that one of the other texts may be selected and designated as a candidate match. Selecting that one of the other texts may include displaying that candidate match as a first possible matching text on a display such as the display monitor 724. If the cosine distance for one of the other text potions of the other texts is greater than or equal to the given first distance threshold, that particular text may be considered as being less relevant or irrelevant and might not be selected. In this case, that analyzed other text may be replaced by a new text. The new word embedding vector may be generated on the basis of a discrete representation of words of the new text using the word embedding model 312. Furthermore, the query word embedding or vector of the selected word may be compared with the new word embedding or vector. The comparison may be repeatedly performed as long as the comparison difference threshold is exceeded so that the compared text is not selected as a candidate match. During a repeatedly performed comparison, the compared text may be an updated text that is a new text, each time the comparison is repeated. The candidate match may be a text of the other texts. Thus, this display of the candidate match may occur dynamically in that a displayed text may be replaced on the display by another possibly matching text that is a closer match to the search text, as the text searching program 110a, 110b proceeds with searching through multiple and/or numerous other texts to identify relevant texts.

FIG. 6 shows a cosine distance calculation as part of the text searching process 200 according to at least one embodiment. In this embodiment, a search sequence from a text was created which used the word "hormone" as the query word. A first cosine calculation 602 for the search sequence based on the word "hormone" is shown. Various other texts were checked for relevancy or similarity to the search sequence that contained the word "hormone". A second cosine calculation 604 was performed on a document by Colditz et al. (1995) in which the word "estrogen" was used as a basis for the text portion. A cosine distance calculation 606 was then performed comparing the cosine distance between the results of the first cosine calculation 602 and the second cosine calculation 604. The cosine distance calculation included a distance output 608 which in this case was 0.283305 . . . . A similarity 610 of the Colditz article to the first article was calculated using the formula [1−the distance output 610]. In this instance, this calculation indicated that the Colditz article was the closest match to the first article as compared to calculations generated from text portions from other articles. Cosine distance calculations are present in many programming language libraries and may be performed on embeddings or vectors for sequences or text portions.

In the step 226 of the text searching process 200, the similarities of the first word embedding as compared to the other word embeddings are ranked. This ranking may be performed on the basis of the results of the comparison or comparisons that was/were performed in step 224. Comparisons with a lower difference between potential target text and the search text may be ranked higher in the similarity ranking.

In the step 228 of the text searching process 200, a candidate match of the other texts is presented that is most similar to the first word embedding. This designation may be determined on the basis of the comparison of step 224 and/or the ranking of step 226. Once the embeddings or vectors or tensors are compared and the matching and/or the ranking is performed, the text searching program 110a, 110b may track back to determine which of the other texts corresponds to the candidate match or to all candidate matches. A set of the other texts linked to their embeddings or vectors or tensors may be stored and accessed as part of the performance of the text searching process 200. This set of linkings may include pointers to storage locations of the other texts.

According to one embodiment, this step 228 may include presenting a visual display of the candidate match, e.g., via the display monitor 724. The step 228 may in addition or alternatively include an audio presentation, via a microphone connected wirelessly or in a wired manner to a computer, e.g., the computer 102, of the candidate match that is most similar to the search sequence. This presentation may allow a user to follow a decision process of the selecting via the text searching program 110a, 110b of one of the other texts or of a particular text portion of one of the other texts.

The selecting of the candidate match may include loading the text of the candidate match from a RAM of a server into a cache of a processor, e.g., processor 104 or processor 706 (see FIG. 7), for further processing. The further processing may include generating a list of multiple texts or multiple text portions that had embedding measurement differences less than a threshold. This list may also be presented via a visual display on a computer monitor and/or via an audio display via a microphone associated with or connected to a computer. The list may present rankings according to a scale with higher similarity to the search query occurring in an ascending order, or alternatively in a descending order. For example, a first other text source may be ranked higher in the list in case an averaged sum of the cosine distances of the selected word embedding vectors of the first other text source is lower than an averaged sum of the cosine distances of the selected word embedding vectors of a second other text source.

The display may include a highlight of the query word in the search text and/or a highlight of the query word or the synonym or the similar word that was used for the basis of the generation of the text portions of the other texts.

In the query 230 of the text searching process 200, the text searching program 110a, 110b determines whether more search queries have been given to be searched. If no, then the text searching process 200 may be ended for the time. If more search queries have been given or are coming forthwith, then the text searching process 200 can return to the first path for performance of step 202 and for subsequent performance of steps 206, 210, 214, 218, 220, and 222 followed by another performance of steps 224, 226, 228, and query 230.

According to at least some embodiments, various words of the search text may be selected so that a respective query word embedding or vector of each selected word and their contexts may be generated. These multiple query word embeddings or vectors may be generated by using respective individual discrete representation of the various selected words of the search text and by feeding these individual discrete representations to the word embedding model 312. The performing of the comparison may include comparing each query word embedding or vector of the various respective selected words with word embeddings or vectors of the text portions of the various other texts. This embodiment may be considered as an extension of the aforementioned variant of selecting only one word of the search text to be the query word. Of course, by selecting various words and constructing various query embeddings or vectors a context of each selected word may be compared against various contexts of the other text sources. Thus, this embodiment may present a more sophisticated variant of not only capturing the context of one selected word but capturing a context of the search text for multiple words or parts or as a whole in the form of the contexts of the various selected words.

According to one embodiment, various words of a set of search texts may be selected. The set of search texts may include various search texts including the search text received in step 202. Respective query word embeddings or vectors of each selected word may be generated on the basis of a respective individual discrete representation of the words of the respective search text using the word embedding model 312. According to this embodiment, the performing of the comparison may include comparing each query word embedding or vector of the various respective selected words with word embeddings or vectors of the various other texts. This embodiment may allow a user to define a combined context of contexts of various words used in different parts of a search text source. The search texts of the set of search texts may be all formed by one document. However, in another example, the search texts of the set of search texts may be parts of different document sources.

The text searching program 110a, 110b may also be implemented for multilingual transfer learning models so that multilingual selection-based search works out of the box.

Figure 7:
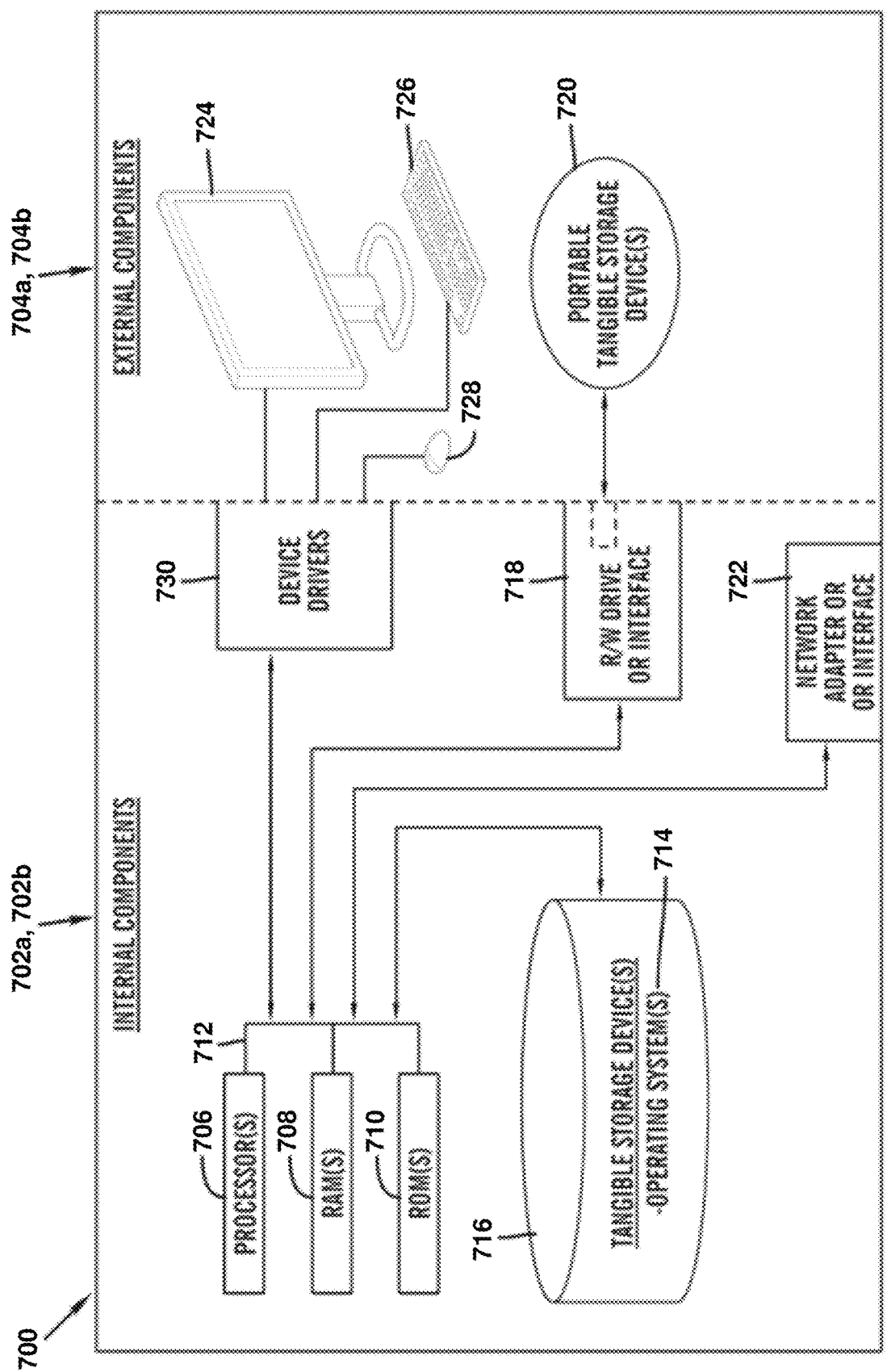
FIG. 7 is a block diagram of internal and external components of computers and servers depicted in FIG. 1 according to at least one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 702a, 702b, 704a, 704b is representative of any electronic device capable of executing machine-readable program instructions. Data processing system 702a, 702b, 704a, 704b may be representative of a smart phone, a computer system, PDA, or other electronic devices. Examples of computing systems, environments, and/or configurations that may represented by data processing system 702a, 702b, 704a, 704b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 702a, 702b and external components 704a, 704b illustrated in FIG. 7. Each of the sets of internal components 702a, 702b includes one or more processors 706, one or more computer-readable RAMs 708 and one or more computer-readable ROMs 710 on one or more buses 712, and one or more operating systems 714 and one or more computer-readable tangible storage devices 716. The one or more operating systems 714, the software program 108, and the text searching program 110a in computer 102, and the text searching program 110b in server 112, may be stored on one or more computer-readable tangible storage devices 716 for execution by one or more processors 706 via one or more RAMs 708 (which typically include cache memory). In the embodiment illustrated in FIG. 7, each of the computer-readable tangible storage devices 716 is a magnetic disk storage device of an internal hard drive. Alternatively, each of the computer-readable tangible storage devices 716 is a semiconductor storage device such as ROM 710, EPROM, flash memory, or any other computer-readable tangible storage device that can store a computer program and digital information.

Each set of internal components 702a, 702b also includes a R/W drive or interface 718 to read from and write to one or more portable computer-readable tangible storage devices 720 such as a CD-ROM, DVD, memory stick, magnetic tape, magnetic disk, optical disk or semiconductor storage device. A software program, such as the software program 108 and the text searching program 110a, 110b can be stored on one or more of the respective portable computer-readable tangible storage devices 720, read via the respective R/W drive or interface 718 and loaded into the respective hard drive 716.

Each set of internal components 702a, 702b may also include network adapters (or switch port cards) or interfaces 722 such as a TCP/IP adapter cards, wireless wi-fi interface cards, or 3G or 4G wireless interface cards or other wired or wireless communication links. The software program 108 and the text searching program 110a in computer 102 and the text searching program 110b in server 112 can be downloaded from an external computer (e.g., server) via a network (for example, the Internet, a local area network or other, wide area network) and respective network adapters or interfaces 722. From the network adapters (or switch port adaptors) or interfaces 722, the software program 108 and the text searching program 110a in computer 102 and the text searching program 110b in server 112 are loaded into the respective hard drive 716. The network may include copper wires, optical fibers, wireless transmission, routers, firewalls, switches, gateway computers and/or edge servers.

Each of the sets of external components 704a, 704b can include a computer display monitor 724, a keyboard 726, and a computer mouse 728. External components 704a, 704b can also include touch screens, virtual keyboards, touch pads, pointing devices, and other human interface devices. Each of the sets of internal components 702a, 702b also includes device drivers 730 to interface to computer display monitor 724, keyboard 726 and computer mouse 728. The device drivers 730, R/W drive or interface 718 and network adapter or interface 722 include hardware and software (stored in storage device 716 and/or ROM 710).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
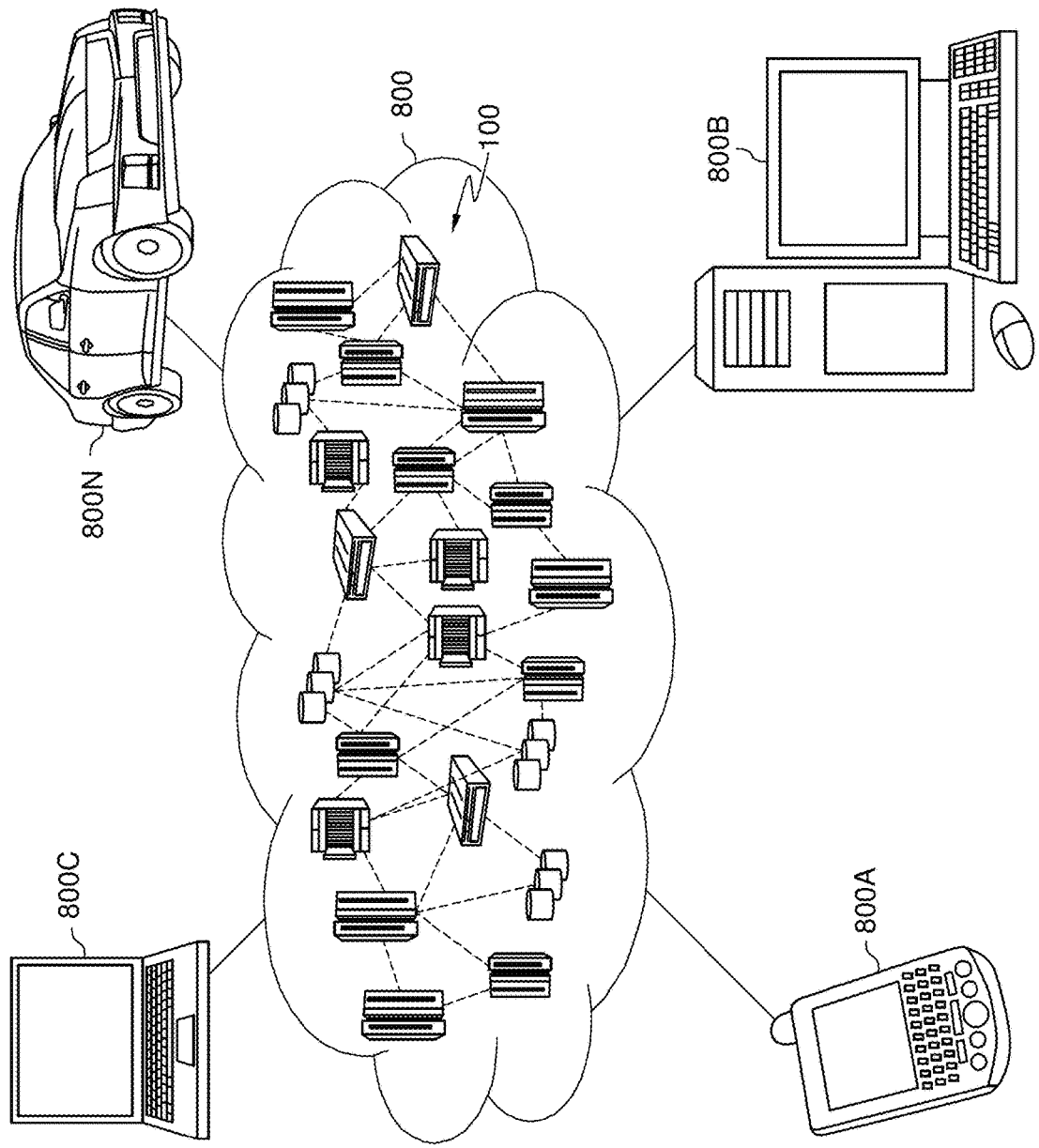
FIG. 8 is a block diagram of an illustrative cloud computing environment including the computer system depicted in FIG. 1, in accordance with an embodiment of the present disclosure.

Referring now to FIG. 8, illustrative cloud computing environment 800 is depicted. As shown, cloud computing environment 800 comprises one or more cloud computing nodes 100 with which local computing devices used by cloud consumers, such as, for example, personal digital assistant (PDA) or cellular telephone 800A, desktop computer 800B, laptop computer 800C, and/or automobile computer system 800N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 800 can communicate with any type of computerized device over any type of network and/or network addressable connection (e.g., using a web browser).

Figure 9:
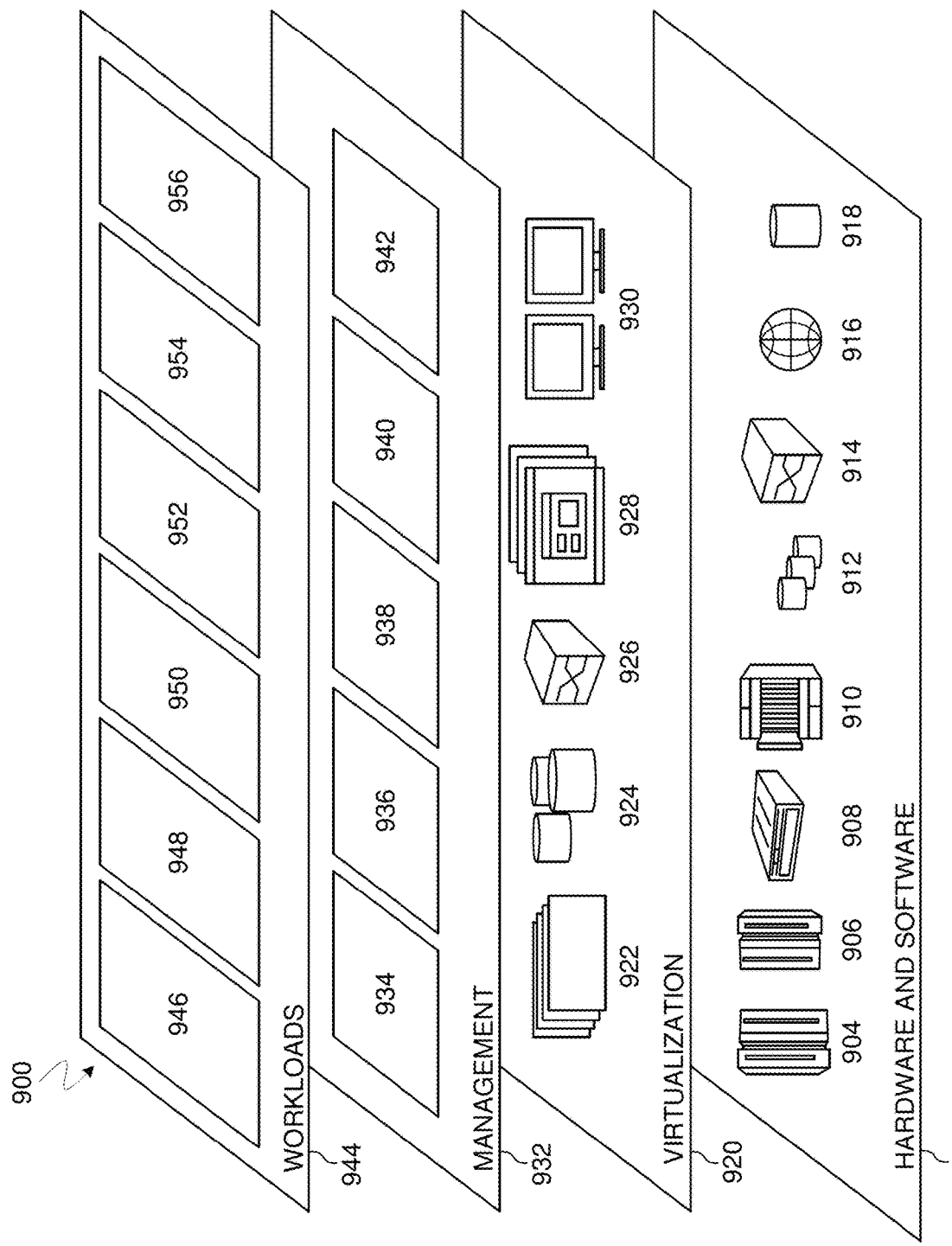
FIG. 9 is a block diagram of functional layers of the illustrative cloud computing environment of FIG. 8, in accordance with an embodiment of the present disclosure.

Referring now to FIG. 9, a set of functional abstraction layers 900 provided by cloud computing environment 800 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and text searching 956. A text searching program 110a, 110b provides a way to more precisely find semantically relevant content when performing a text search.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for searching, the method comprising:
receiving, via a computer system and from a user, a text comprising words;
inputting, via the computer system, the text into a machine learning model;
in response to the inputting, receiving, via the computer system and as output from the machine learning model, a respective value corresponding to each of the words;
determining, based on the text and on the respective values of the words, at least one query word and a context for the at least one query word, the at least one query word and the context being taken from the received text, the at least one query word being disposed within the context within the received text;
generating, via the computer system, a first word embedding by inputting a sequence comprising the at least one query word and the context into a word embedding model that resultantly outputs the first word embedding, the at least one query word and the context being concatenated to each other in the sequence, wherein the word embedding model generates the first word embedding by generating a tensor, the first word embedding comprises a first vector, the tensor represents multi-dimensional vectors for each word in the sequence, and the first vector is positioned in a row of the tensor corresponding to a sequential index position of the first query word in the sequence, wherein the first word embedding is selected based on the sequential index position of the first query word in the sequence and other output embeddings based on other sequential index positions of the sequence are discarded, wherein the word embedding model comprises a neural network comprising layers, each layer comprises a number of nodes corresponding to a number of all tokens of the sequence, respectively, each of the nodes hosts a respective embedding, and nodes of a subsequent layer of the layers use all embeddings of a preceding layer to influence calculations of the respective embeddings in the subsequent layer;
comparing, via the computer system, the first word embedding with other word embeddings, the other word embeddings having been generated by inputting respective text portions of other texts into the word embedding model; and
presenting, via the computer system, a candidate match of the other texts, wherein a respective word embedding of the candidate match text is, of the other word embeddings, most similar to the first word embedding according to the comparing.

2. The method of claim 1,
wherein the other word embeddings comprise respective other vectors;
wherein the comparing comprises comparing, via the computer system, the first vector with the other vectors individually; and wherein a respective other vector of the candidate match is most similar to the first vector according to the comparing.

3. The method of claim 1, wherein the neural network is an attention-based transformer neural network; and
wherein the generating the first word embedding comprises combining vector representations generated by at least a first layer and a second layer of the layers.

4. The method of claim 1, further comprising:
generating a discrete representation of the sequence, wherein the discrete representation comprises representations of syllables of the sequence;
wherein the inputting the sequence into the word embedding model comprises inputting the discrete representation into the word embedding model.

5. The method of claim 1, further comprising filtering pre-selected words from the sequence before inputting the sequence into the word embedding model.

6. A computer system for document searching, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving a text;
receiving, via a user actuating the computer system, a first selection of a word amongst the text and a second selection of a context of the word amongst the text, the text comprising other words in addition to the word and in addition to the context, the first selection comprising a first actuation by the user and the second selection comprising a second actuation by the user, the first actuation being separate from the second actuation;
generating a first word embedding by inputting a sequence comprising the word and the context into a word embedding model that resultantly outputs the first word embedding, the word and the context being concatenated to each other in the sequence, wherein the word embedding model generates the first word embedding by generating a tensor, the first word embedding comprises a first vector, the tensor represents multi-dimensional vectors for each word in the sequence, and the first vector is positioned in a row of the tensor corresponding to a sequential index position of the first query word in the sequence, wherein the first word embedding is selected based on the sequential index position of the first query word in the sequence and other output embeddings based on other sequential index positions of the sequence are discarded, wherein the word embedding model comprises a neural network comprising layers, each layer comprises a number of nodes corresponding to a number of all tokens of the sequence, respectively, each of the nodes hosts a respective embedding, and nodes of a subsequent layer of the layers use all embeddings of a preceding layer to influence calculations of the respective embeddings in the subsequent layer;
comparing the first word embedding with other word embeddings, the other word embeddings having been generated by inputting respective text portions of other texts into the word embedding model; and
presenting a candidate match of the other texts, wherein a respective word embedding of the candidate match is, of the other word embeddings, most similar to the first word embedding according to the comparing.

7. The computer system of claim 6,
wherein the other word embeddings comprise respective other vectors;
wherein the comparing comprises comparing, via the computer system, the first vector with the other vectors individually; and
wherein a respective other vector of the candidate match is most similar to the first vector according to the comparing.

8. A computer program product for searching, the computer program product comprising a computer-readable storage medium having program instructions embodied therewith, wherein the program instructions are executable by a computer system to cause the computer system to perform a method comprising:
receiving a first query word and a context of the first query word, the context comprising additional words, wherein the first query word is selected based on a combination of a user selection and an automated selection amongst words of a text containing the first query word and the additional words;
generating a first word embedding by inputting a sequence comprising the first query word and the context into a word embedding model that resultantly outputs the first word embedding, the first query word and the context being concatenated to each other in the sequence, wherein the word embedding model generates the first word embedding by generating a tensor, the first word embedding comprises a first vector, the tensor represents multi-dimensional vectors for each word in the sequence, and the first vector is positioned in a row of the tensor corresponding to a sequential index position of the first query word in the sequence, wherein the first word embedding is selected based on the sequential index position of the first query word in the sequence and other output embeddings based on other sequential index positions of the sequence are discarded, wherein the word embedding model comprises a neural network comprising layers, each layer comprises a number of nodes corresponding to a number of all tokens of the sequence, respectively, each of the nodes hosts a respective embedding, and nodes of a subsequent layer of the layers use all embeddings of a preceding layer to influence calculations of the respective embeddings in the subsequent layer;
comparing the first word embedding with other word embeddings, the other word embeddings having been generated by inputting respective text portions of other texts into the word embedding model; and
presenting a candidate match of the other texts, wherein a respective word embedding of the candidate match is, of the other word embeddings, most similar to the first word embedding according to the comparing.

9. The method of claim 1, wherein the at least one query word comprises more than one word.

10. The method of claim 1, wherein the candidate match is selected based on an averaged sum of comparison scores of multiple other word embeddings within the candidate match.

11. The method of claim 1, wherein the other word embeddings comprise a second word embedding generated by inputting into the word embedding model another sequence comprising a synonym to the at least one query word and another context for the synonym in an additional text, wherein the inputting of the other sequence causes the word embedding model to output the second word embedding.

12. The method of claim 5, wherein the pre-selected words that are filtered are from a block list that is manually adjusted by a user.

13. The computer system of claim 6, wherein the second selection of the context is received via the user identifying the context amongst the other words while at least some of the other words are displayed on a display screen of the computer system.

14. The computer system of claim 13, wherein the identification of the context occurs via the user actuating an input device of the computer system to drag a container around the context displayed on the display screen.

15. The computer program product of claim 8, wherein the automated selection of the first query word comprises inputting the text into a machine learning model and, in response to the inputting, receiving the first query word as output from the machine learning model.

16. The computer program product of claim 15, wherein the machine learning model is trained on a member selected from a group consisting of a search history of the user, a personal profile of the user, a domain of the user, a domain of the text, a location assigned to the query or the user, a time assigned to the query or the user, and an intention assigned to the query or to the user.

17. The computer program product of claim 8, further comprising weighting a user-selected query word higher than the automatically-selected query word.

18. The computer program product of claim 8, wherein the automated selection comprises selecting the first query word from the text due to the first query word having an entry in a specialized dictionary.

19. The computer system of claim 6, wherein the neural network is an attention-based transformer neural network; and wherein the generating the first word embedding comprises combining vector representations generated by at least a first layer and a second layer of the layers.

20. The computer system of claim 6, wherein the at least one query word comprises more than one word.

* * * * *